June 17, 1924.   E. M. BRADLER   1,498,421
COMBINATION OPENER
Filed Oct. 7, 1922
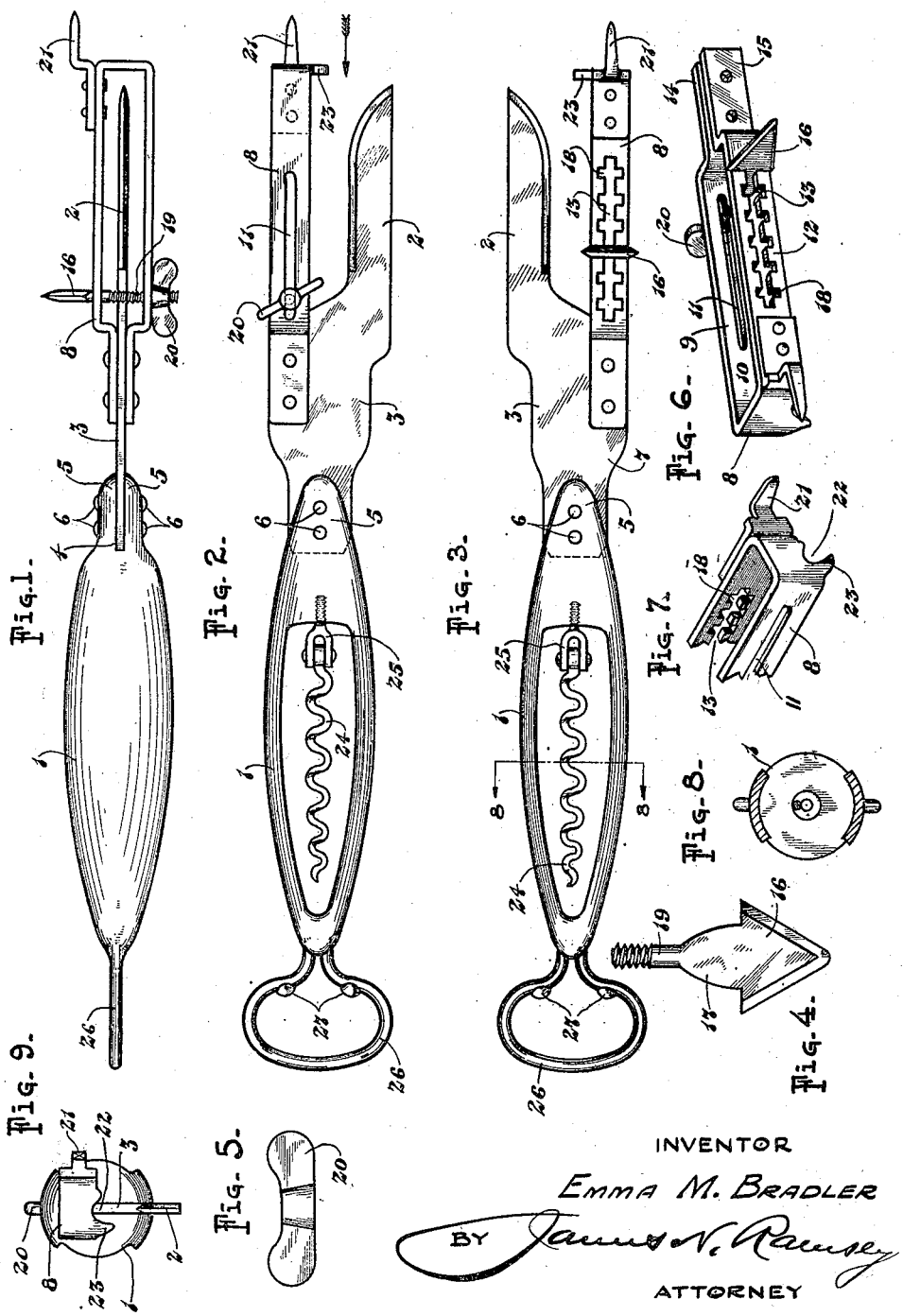
INVENTOR
Emma M. Bradler
BY James N. Ramsey
ATTORNEY Patented June 17, 1924.

1,498,421

UNITED STATES PATENT OFFICE.

EMMA M. BRADLER, OF CINCINNATI, OHIO.

COMBINATION OPENER.

Application filed October 7, 1922. Serial No. 592,989.

*To all whom it may concern:*

Be it known that I, EMMA M. BRADLER, a citizen of the United States, residing at Cincinnati, in the county of Hamilton and State of Ohio, have invented certain new and useful Improvements in Combination Openers, of which the following is a specification.

My invention relates particularly to means for opening cans and bottles.

The object of my invention is to provide a simple, compact, efficient, convenient and economical opener for use in opening cans and bottles having closures of varying kinds and sizes.

My invention consists in the construction, combination and arrangement of parts as herein set forth and claimed.

In the drawings:

Fig. 1 is an edge view;

Fig. 2 is a view of one side;

Fig. 3 is a view of the other side;

Fig. 4 is a side view of the detachable adjustable cutter;

Fig. 5 is a side view of the thumb-nut therefor;

Fig. 6 is a perspective view of the supporting rack;

Fig. 7 is a perspective view of the free end thereof;

Fig. 8 is a section on the line 8—8 of Fig. 3; and

Fig. 9 is an end view of Fig. 2 looking in the direction of the arrow.

In the embodiment of my invention as illustrated and which shows a preferred construction I provide a hollow handle 1 having knife 2 provided with shank 3 secured in slot 4 between ears 5 of handle 1 by rivets 6 or other suitable fastening means. Shank 3 is provided with shoulder 7 on which supporting rack 8 is mounted. Said supporting rack comprises an open frame 9 having side wall 10 provided with longitudinal slot 11 and side wall 12 provided with longitudinal indented slot 13 forming a double rack. The members 10 and 12 of the supporting rack are widely spaced apart and have integrally formed ears 14 and 15 slightly spaced apart and embracing shoulder 7 to which it is riveted or otherwise suitably fastened.

Adjustable double-edge tapering knife 16 is provided with a flat web 17 adapted to fit in notches 18 and having a threaded shank 19 adapted to enter slot 11 and be secured in adjusted position therein by thumb-nut 20. Supporting rack 8 is provided upon its outer end with bayonet piercing and holding point 21. It is also provided with bearing notch 22 and projection 23 for cooperative use with knife 2 when using said knife in cutting a can lid.

Corkscrew 24 is pivotally mounted in yoke-screw 25 in slotted handle 1, said corkscrew being adapted to rest within the slot when in closed position and to be adjusted at right angles thereto when in position for use, and it may be pushed to either side of the handle for use, as desired.

The end of the handle is provided with a loop 26 having lugs 27 on its inner edge adapted to engage the edge of a crown bottle cap to pry it off of the bottle.

An important advantage of my invention consists in the novel means for securing the adjustable double-edged knife in various adjusted positions depending upon the size of can lid to be cut open. In Fig. 6 it is shown in the inner end notches 18 which is the position required for cutting open a lid of maximum size, while in Fig. 3 it is shown secured in a set of the intermediate notches which adapts it for cutting open a smaller-sized lid. The peculiar construction and arrangement of parts is such that the adjustment is very simple and convenient and at the same time holds the knife firmly and securely in position while in the act of cutting, there being no danger whatever of its slipping or sliding longitudinally in the longitudinal slots 11 and 13. Another advantage of my invention is the circular formation of handle 1 tapering toward each end to form a natural handhold by which to hold the opener firmly when in use. Still another advantage is the provision by which the corkscrew is housed entirely within the handle and is adapted to be swung outwardly to either side thereof for use.

The operation of the device is as follows: When opening a can, such as the ordinary tin can, thrust the piercing or holding point 21 through the center of the can lid and draw the opener to substantially horizontal position, adjusting knife 16 to the proper position relative to the periphery of the lid; then firmly secure the knife by the thumb-screw and press downwardly forcing its point through the lid, whereupon the knife may be drawn either way around the pivotal point formed by the piercing and holding point, thereby severing or partially severing the central part of the lid from the can, as desired.

If for any reason the can is too large for the capacity of adjustable knife 16, knife 2 may be used by piercing the lid adjacent its periphery with the point of the knife and then pulling the knife upwardly and forwardly through the lid and forcing bearing notch 22 into sliding engagement with the projecting rim of the can with projecting lug 23 bearing against the outside of the rim, thereby forming a fulcrum for the knife.

To operate the corkscrew simply push it at right angles to either side of the handle and turn it into the cork in the usual manner. The piercing point 21 may be inserted in a paper cap of a milk bottle by which it may be lifted out of position.

While I have shown and described a particular construction and arrangement of parts it will be understood that various modifications may be made without departing from the scope or spirit thereof as defined in the claim, as for instance, the handle and knife 2 may be formed in one piece, or the handle and supporting rack may be formed of one piece and the knife suitably attached thereto.

What I claim as new and desire to secure by Letters Patent is:

In a combination opener, a handle, a supporting rack carried thereby and having spaced-apart slotted walls, one of which slots is provided with transverse notches, a double-edge knife having a web adapted to engage said notches and having a stem projecting through the longitudinal slot, and a thumb-nut adapted to secure said knife in any adjusted position desired.

EMMA M. BRADLER.